3,438,906
IODINE-CONTAINING NONIONIC
SURFACTANT COMPOSITIONS
Jacque L. Duvall, Grosse Ile, Mich., assignor to Wyandotte Chemicals Corporation, Wyandotte, Mich., a corporation of Michigan
No Drawing. Filed July 26, 1965, Ser. No. 474,949
Int. Cl. C11d 3/48; C07c 103/32
U.S. Cl. 252—106       14 Claims

ABSTRACT OF THE DISCLOSURE

Iodine-containing compositions are obtained by mixing elemental iodine with liquid, biodegradable, nonionic, heteric surfactants having enhanced detergency. The heteric surfactants are prepared by condensing a mixture of ethylene oxide and propylene oxide in a weight ratio of ethylene oxide to propylene oxide of from 1.3:1 to 6.8:1 with an organic compound having an active hydrogen atom and from 8 to 22 carbon atoms, the amount of oxide mixture being 67% to 80% of the total weight of the surfactant. The iodine-containing compositions may then be diluted with water and acidified. The diluted compositions are advantageously used to clean and sterilize metal parts and equipment.

---

This invention relates to liquid, detergent, germicidal and sanitizing iodine-containing compositions which, upon acidification and dilution with water, are particularly adapted for use in the cleaning and sanitizing of foodhandling equipment. More particularly, this invention relates to iodine-containing compositions in which the iodine is complexed with a liquid, biodegradable, water-miscible, nonionic surfactant.

Iodine-containing, detergent, germicidal and sanitizing compositions are well known in the art, as are the various needs for, and advantages associated with, these compositions. Generally, these compositions are prepared by complexing iodine with a surfactant. Various surfactants have been employed in this application, including the Pluronic polyols, a trademark of Wyandotte Chemicals Corporation which designates the compounds disclosed and claimed in U.S. Patent No. 2,674,619, compounds sold under the name Antarox, a trade name of General Aniline & Film Corporation which designates a series of alkyl aryl polyether glycols, compounds sold under the name Nacconol, a trade name of Allied Chemical Corporation which designates a group of alkyl aryl sulfonates, and those compounds disclosed in U.S. Patents Nos. 1,970,578 and 2,213,477. Although the surfactants listed above are effective iodine carriers, they lack at least one property presently essential to their continued use in this application, that is, biodegradability. It is now established that if surfactants are to be used in commercial iodine formulations, they must be biodegradable. In addition to being biodegradable, the surfactants must also be water-miscible, they should possess enhanced detergency and they should be liquids in order to facilitate preparation and handling of the resulting compositions.

Now, in accordance with this invention, new detergent, germicidal and sanitizing iodine-containing compositions are obtained by mixing elemental iodine with a liquid, biodegradable, water-miscible, nonionic surfactant prepared by the condensation of a mixture of ethylene oxide and propylene oxide with an organic compound containing an active hydrogen atom and from 8 to 22 carbon atoms in straight chain relationship. The nonionic surfactants which are employed in this invention may be represented by the following formula:

$$R°—A—X—(R'H)_a$$

wherein R° is H or $X(R'H)_a$, A is a straight chain hydrocarbyl radical having from 8 to 22 carbon atoms, X is O, S,

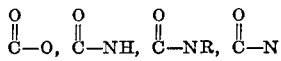

NH, NR, N, PO$_4$, SO$_3$NH, SO$_3$NR, SNH, SNR, or SN, $a$ is 1 when X is O, S,

NH, NR, PO$_4$, SO$_3$NH, SO$_3$NR, SNH, or SNR and 2 when X is

N, SO$_3$N, or SN, R is an alkyl group having from 1 to 4 carbon atoms, and R' is a mixture of oxyethylene and oxypropylene groups, said mixture being from 67% to 80% of the total weight of the surfactant, the weight ratio of oxyethylene to oxypropylene groups in said mixture being in the range of from 1.3:1 to 6.8:1. It is to be understood that if a mixture of organic compounds is employed in the condensation reaction, the product obtained will be a mixture of compounds having the foregoing formula.

The nonionic surfactants which are preferably employed in this invention are those prepared from a straight chain aliphatic alcohol, ethylene oxide and propylene oxide. They may be represented by the following formula:

$$R°—A—O—(R')_a—H$$

wherein R° is H, A is a straight chain alkylene group having from 8 to 22 carbon atoms, $a$ is 1 and R' is the same as described above. The R°—A—O in the foregoing formula may also be defined as the residue of the alcohol employed in the condensation reaction, that is, the alcohol with the active hydrogen removed.

Organic compounds which may be employed in the preparation of the nonionic surfactants used in accordance with this invention are those compounds which contain an active hydrogen atom and a straight chain alkyl group having from 8 to 22 carbon atoms. Alcohols, mercaptans, carboxylic acids, substituted carboxylic acids, amides, substituted amides, amines, substituted amines, orthophosphates, sulfonamides, substituted sulfonamides, thioamides, substituted thioamides, and mixtures thereof are illustrative of those compounds which are operable. As mentioned above, alcohols are the preferred compounds and mixtures of alcohols are more preferred since their use provides for a good balance of properties in the resulting surfactants. Branched chain organic compounds are not operable nor are organic compounds containing less than eight carbon atoms since these compounds do not impart biodegradability to the resulting products, nor do the products resulting from their use, along with the stated amounts of oxides, possess good detergency. However, it is possible to employ small amounts of branched chain organic compounds along with the straight chain organic compounds employed in this invention as long as the biodegradability of the resulting product is not impaired. Examples of alcohols which are operable include n-octyl alcohol, n-nonyl alcohol, n-decyl alcohol, n-dodecyl alcohol, n-tridecyl alcohol, n-tetradecyl alcohol, cetyl alcohol, lauryl alcohol, stearyl alcohol, and mixtures thereof.

Examples of mercaptans which are operable include n-dodecyl thiol, 2-dodecyl thiol, n-tetradecyl thiol, n-hexadecyl thiol, n-octadecyl thiol, n-decyl thiol, and mixtures thereof.

Examples of carboxylic acids which are operable include both the mono- and dicarboxylic acids such as 1,12-dodecane dicarboxylic acid, 1-10-decane dicarboxylic acid, n-octanoic acid, n-decanoic acid, n-dodecanoic acid, n-tetradecanoic acid, n-hexadecanoic acid, ricinoleic acid, oleic acid, linoleic acid, linolenic acid, and mixtures thereof.

Examples of amides which are operable include n-octyl amide, n-decyl amide, n-dodecyl amide, n-tetradecyl amide, n-hexadecyl amide, n-octadecyl amide, n-oleic amide, n-linoleic amide, n-linolenic amide, ricinoleic amide, N-methyl-n-dodecyl amide, N-ethyl-n-tetradecyl amide, N - butyl - n - octadecyl amide, $\alpha,\omega$-dodecandioic monoamide, $\alpha,\omega$-dodecandioic diamide, and mixtures thereof.

Examples of amines which are operable include n-octyl amine, n-decyl amine, n-dodecyl amine, n-tetradecyl amine, n-hexadecyl amine, n-octadecyl amine, n-tridecyl amine, sec-dodecyl amine, N-methyl-n-dodecyl amine, N-ethyl-n-tetradecyl amine, and mixtures thereof.

Examples of phosphates which are operable include monostearyl orthophosphate, monolauryl orthophosphate, monodecyl orthophosphate, monooleyl orthophosphate, and mixtures thereof.

Examples of sulfonamides which are operable include n-octyl sulfonamide, n-decyl sulfonamide, n-dodecyl sulfonamide, N-methyl-n-decyl sulfonamide, N-propyl-n-octyl sulfonamide, and mixtures thereof.

Examples of thioamides which are operable include n-octyl thioamide, n-decyl thioamide, N-ethyl-n-octyl thioamide, N-methyl-n-tridecyl thioamide, and mixtures thereof.

The surfactants employed in this invention are prepared by condensing an organic compound, or mixture of organic compounds as described above, with a mixture of ethylene oxide and propylene oxide. The products have a heteric structure. By this is meant that the products possess random distribution of oxyethylene and oxypropylene groups. The amount of oxide which is used in the preparation of the surfactants is very important. In order to obtain the products utilizable in this invention, it is important that the oxides be employed in a weight ratio of ethylene oxide to propylene oxide of from 1.3:1 to 6.8:1, preferably 1.5:1 to 4:1. Not only is it important that the ratio of ethylene oxide to propylene oxide be maintained in the above-stated ranges, but also it is important that the total amount of oxides employed be such that the products contain from 67% to 80% by weight of oxyethylene and oxypropylene groups. If products are prepared using amounts of ethylene oxide and propylene oxide which are outside of the above-stated ratio or which do not result in a product containing from 67% to 80% by weight of oxide, the products will not possess all of the desired properties, that is, liquid, water-miscible and biodegradable, essential to their use in this invention.

The nonionic surfactants employed in this invention are generally prepared by condensing an organic compound with a mixture of ethylene oxide and propylene oxide in the presence of an alkaline catalyst. Catalysts which may be employed include sodium hydroxide, potassium hydroxide, sodium ethylate, sodium methylate, potassium acetate, sodium acetate, trimethylamine and triethylamine. Any other types of catalyst commonly used for alkylene oxide condensation reactions may also be employed. After the condensation reaction is completed, the catalyst may be removed from the reaction mixture by any known procedure such as neutralization and filtration or ion exchange. The condensation is preferably carried out at elevated temperatures and pressures.

The iodine-containing compositions of this invention are prepared by dissolving elemental iodine in the above-described nonionic surfactants. The amount of iodine dissolved in the surfactant will be such that provides for the preparation of a germicidal composition. In the vernacular of the germicide art, this amount is referred to as a "germicidally effective amount." Generally, from about 0.01 part to about 0.50 part, preferably from 0.15 part to 0.30 part by weight, of iodine per part of nonionic surfactant will be employed, the maximum amount being a function of the solubility of iodine in the particular surfactant selected. The exact amount of iodine which will be complexed with the nonionic surfactants will also vary with the particular use for which the complex is intended. The lower amounts are more appropriate for hand-washing operations, while the higher amounts are more useful in food-handling industries.

In actual use, the iodine complexes of this invention are acidified and diluted with water. Generally, based on 100 parts by weight of diluted composition, from about 2 parts to about 50 parts, preferably from about 5 parts to about 20 parts, of iodine complex will be employed. This will result in a diluted composition comprising from 0.2 part to 3.0 parts, preferably from 1 part to 2 parts, of available iodine. Acidification is necessary since a pH of from about two to about four is desired in use dilutions (i.e., at 25 and 12.5 p.p.m. available iodine) in order for the iodine to exhibit optimum germicidal activity. Within this pH range, diatomic iodine is released from the surfactant carrier in maximum quantities.

In the preparation of the diluted compositions of this invention, it is often desirable to add from one part to ten parts, based on 100 parts by weight of diluted composition, of a stabilizing agent. Any biodegradable surfactant may be employed as the stabilizing agent. Preferably, the same surfactant that is used to complex the iodine will be employed as stabilizer. Alcohols, particularly ethanol and isopropanol, may also be employed as stabilizers.

A number of acids may be used to acidify the diluted iodine compositions of this invention. Although phosphoric acid is preferred, acids such as hydrochloric, sulfamic, hydroxyacetic, citric, malic, and mixtures thereof may be employed. The amount of acid employed will generally be such as will bring the pH of the diluted iodine compositions in the range of from two to four. Generally, the acid will comprise from about 0.5 part to 35 parts, by weight, based on 100 parts of diluted composition. The amount of acid employed will generally depend upon the intended use of the compositions. The compositions containing high amounts of acid may be used to clean and sterilize equipment made of stainless steel, while the compositions containing low amounts of acid may be used to sterilize and clean aluminum and galvanized iron.

The amount of water employed in the preparation of the diluted compositions of this invention may vary considerably and is not critical. Generally, however, from 15 parts to 97.5 parts of water, based on 100 parts by weight of diluted composition, may be employed.

The following examples illustrate the invention. All parts are by weight unless otherwise stated.

Examples I–VIII

A number of nonionic surfactants were prepared from a mixture of aliphatic alcohols, ethylene oxide and propylene oxide. Most of the surfactants prepared fall within the class defined hereinbefore. However, some were prepared which are outside of this class. The surfactants were prepared in the following manner. Details as to the preparations are found in Table 1.

A clean, dry reactor was purged with nitrogen and charged with a mixture of straight chain aliphatic alcohols and a potassium hydroxide catalyst. In each instance, the mixture was stirred at from 150° C. to 175° C. while a mixture of ethylene oxide and propylene oxide was added over a period of from three to five hours at from 30 to 70 p.s.i.g. The products were stirred for an additional hour at about 150° C., cooled to about 50° C. and discharged from the reactor. The catalyst was neutralized with glacial acetic acid and volatiles were removed by stripping at 100° C. and at ten millimeters of mercury for one hour. Product recovery was greater than 95% in each case.

The products prepared are characterized in Table 1. Detergency values were obtained using the tagged clay soil removal method. This method is described in "Applied Radiation and Isotope Test Methods," ASTM, STP No. 260, pp. 27–39, 1959. Biodegradability was determined by the shake flask culture technique. This involves first preparing a basal medium of distilled water, yeast extract, ammonium chloride, potassium hydrogen phosphate, magnesium sulfate septahydrate, potassium chloride and ferrous sulfate and then adding a candidate surfactant (in the form of a solution) to the basal medium to give a surfactant concentration of 30 p.p.m. A microbial culture is prepared based on unchlorinated final effluent from an activated sludge sewage disposal plant. The basal medium containing the candidate surfactant is then inoculated with the microbial culture and placed in a shaking machine for aeration. To follow the course of biodegradation, aliquots are removed for analysis (potassium iodobismuthate method, J. Anal. Chem., Burger, K., 196, 251 (1963)) immediately after inoculation and at 24-hour intervals thereafter for a period of seven days. The analysis indicates the amount of surfactant remaining in parts per million. Although there is uncertainty in the art as to that which is biodegradable and that which is not sufficiently biodegradable, for the purpose of this application a surfactant which degrades 85% within seven days is considered biodegradable.

A

| Ingredients: | Parts |
|---|---|
| Surfactant-iodine complex (1.5 parts available iodine) | 8.75 |
| Phosphoric acid (75%) | 11.3 |
| Water | 79.95 |

B

| Surfactant-iodine complex (1.95 parts available iodine) | 11.5 |
|---|---|
| Hydrochloric acid (37%) | 15 |
| Phosphoric acid (75%) | 7 |
| Isopropyl alcohol | 7 |
| Water | 59.5 |

C

| Surfactant-iodine complex (1.87 parts available iodine) | 11 |
|---|---|
| Hydroxyacetic acid (70%) | 12 |
| Phosphoric acid (75%) | 4 |
| Surfactant | 4 |
| Water | 69 |

D

| Surfactant-iodine complex (1.87 parts available iodine) | 11 |
|---|---|
| Sulfamic acid | 11 |
| Phosphoric acid (75%) | 4 |
| Malic acid | 4 |
| Surfactant | 6 |
| Water | 64 |

TABLE 1

| Example | Parts | | | | EO¹/PO² | Product³ | TCSR⁴ + 2% CMC⁵ | |
|---|---|---|---|---|---|---|---|---|
| | Alcohol | EO¹ | PO² | EO¹+PO² | | | Det. | WR |
| I | A, 22 | 68 | 10 | 78 | 6.8:1 | Bio. (>85%) / Liquid, W.M. | 143 | 150 |
| II | A, 25 | 60 | 15 | 75 | 4:1 | Bio. (95%) / Liquid, W.M. | 142 | 156 |
| III | A, 20 | 60 | 20 | 80 | 3:1 | Bio. (95%) / Liquid, W.M. | 152 | 181 |
| IV | A, 16 | 63 | 21 | 84 | 3:1 | NSB (<60%) / Liquid, W.M. | 150 | 195 |
| V | A, 20 | 52 | 28 | 80 | 1.86:1 | Bio. (95%) / Liquid, W.M. | 146 | 111 |
| VI | A, 25 | 41 | 34 | 75 | 1.2:1 | NSB (<60%) / Liquid, W.I. | Not run | |
| VII | B, 20 | 60 | 20 | 80 | 3:1 | Bio. (95%) / Liquid, W.M. | 147 | 156 |
| VIII | C, 20 | 60 | 20 | 80 | 3:1 | Bio. (90%) / Liquid, W.M. | 151 | 170 |

¹ Ethylene oxide.
² Propylene oxide.
³ All characterizations made at room temperature.
⁴ Tagged clay soil removal.
⁵ Sodium carboxymethylcellulose.

A—A mixture containing approximately 40% $C_{12}$ alcohol, 30% $C_{14}$ alcohol, 20% $C_{16}$ alcohol and 10% $C_{18}$ alcohol.
B—A mixture containing approximately 70% $C_{10}$ alcohol and 30% $C_{12}$ alcohol.
C—Hydrogenated tallow alcohol (a mixture containing approximately 32% $C_{16}$ alcohol and 68% $C_{18}$ alcohol).
Bio.—Biodegradable.
NSB—Not sufficiently biodegradable.
W.I.—Water immiscible.
W.M.—Water miscible.

Iodine-containing compositions are prepared by dissolving elemental iodine into the nonionic surfactants prepared in the above examples. The product of Example IV is not suited for commercial application since it is not biodegradable. The same holds true for the product of Example VI which is also water-immiscible and, therefore, not subject to acidification and dilution as required for subsequent use thereof. The remaining products, upon acidification and dilution with water, possess excellent detergent, germicidal and sanitizing properties. They are useful in the cleaning and purification of equipment used in the processing of milk and other daily products.

Example IX

To 80 parts of the nonionic surfactant of Example III was added 20 parts of elemental iodine. The mixture was heated for about one hour at 50° C. Several compositions were prepared by acidifying and diluting with water the iodine-surfactant mixture. The compositions prepared were as follows:

All of the above compositions are tested for detergent, germicidal and sanitizing activity using the Cantor-Shelanski test method (Soap and Sanitary Chemicals, 27, pp. 133, 135, 137 (1951)) at both 25 p.p.m. available iodine and 12.5 p.p.m. available iodine. The above compositions are useful in the cleaning and sanitizing of food-handling equipment.

Example X

A liquid, biodegradable, water-miscible, nonionic surfactant was prepared in the manner set forth in Example I employing 20 parts of 12-hydroxy stearic acid and 80 parts of a mixture of 60 parts of ethylene oxide and 20 parts of propylene oxide. To eighteen parts of this surfactant is added two parts of iodine and the mixture is heated for one hour at 50° C.

A detergent and germicidal composition is formulated by adding to 10 parts of the above-prepared iodine complex, 6.4 parts of phosphoric acid, 4 parts of surfactant and 79.6 parts of water. The above composition exhibits detergent, germicidal and sanitizing activity and is extremely useful when employed in the cleaning of swimming pools.

Example XI

A nonionic surfactant is prepared following the procedure describing in Example I, employing an n-dodecyl amine and a mixture of ethylene oxide and propylene oxide in a weight ratio of ethylene oxide to propylene oxide of 3:1. The surfactant product contains 80 weight percent oxyethylene and oxypropylene groups. To fifteen parts of this surfactant is added five parts of elemental iodine and the mixture is heated for one hour at 50° C.

A germicidal and detergent composition is formulated by adding to ten parts of the iodine-surfactant mixture ten parts of phosphoric acid (75%), four parts of hydrochloric acid (37%), six parts of the surfactant prepared in Example III and 70 parts of water. The composition is effective as a germicidal and detergent composition in the cleaning and sterilization of equipment used to process milk.

Example XII

A nonionic surfactant is prepared following the procedure described in Example I, employing α,ω-dodecandioic monoamide and a mixture of ethylene oxide and propylene oxide in a weight ratio of 3:1. The surfactant product contains 80 weight percent oxyethylene and oxypropylene groups. To twenty parts of this surfactant is added two parts of elemental iodine and the mixture is heated for one hour at 50° C.

A germicidal and detergent composition is formulated by adding to eleven parts of the iodine-surfactant mixture, ten parts of phosphoric acid (75%), six parts of hydrochloric acid (37%), six parts of the nonionic surfactant of Example III and 67 parts of water. The composition is an effective germicide particularly adapted for cleaning and sterilizing hospital instruments.

What is claimed is:

1. A detergent, germicidal and sanitizing composition consisting essentially of a mixture of elemental iodine and a liquid, biodegradable, water-miscible, nonionic surfactant of the formula:

R°—A—X—(R'H)$_a$ wherein R° is H or X(R'H)$_a$, A is a straight chain hydrocarbyl radical having from 8 to 22 carbon atoms or mixtures thereof, X is O, S,

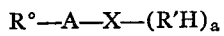

NH, NR, N, PO$_4$, SO$_3$NH, SO$_3$NR, SO$_3$N, SNH, SNR, SN, or mixtures thereof, $a$ is 1 except when X is

N, SO$_3$N, or SN when $a$ is 2, R is an alkyl group having from 1 to 4 carbon atoms and R' is a random mixture of oxyethylene and oxypropylene groups, said mixture being from 67% to 80% of the total weight of the surfactant, the weight ratio of oxyethylene to oxypropylene groups in said mixture being in the range of from 1.3:1 to 6.8:1, said composition having an iodine to surfactant weight ratio of from 0.01:1 to 0.5:1.

2. The composition of claim 1 when the weight ratio of oxyethylene to oxypropylene groups is in the range of 1.5:1 to 4:1.

3. The composition of claim 1 when the nonionic surfactant is:

R°—A—O—(R')$_a$—H wherein R° is H, A is a straight chain alkylene group having from 8 to 22 carbons atoms, $a$ is 1 and R' is as defined in claim 1.

4. The composition of claim 4 when the weight ratio of oxyethylene to oxypropylene groups is in the range of 1.5:1 to 4:1.

5. A detergent, germicidal and sanitizing composition consisting essentially of, based on 100 parts, from
(a) 2 to 50 parts of a mixture of elemental iodine and a liquid, biodegradable, water-miscible, nonionic surfactant of the formula:

R°—A—X—(R'H)$_a$ wherein R° is H or X(R'S)$_a$, A is a straight chain hydrocarbbyl radical having from 8 to 22 carbon atoms or mixtures thereof, X is O,

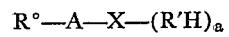

NH, NR, N, PO$_4$, SO$_3$NH, SO$_3$NR, SO$_3$N, SNH, SNR, SN, or mixtures thereof, $a$ is 1 except when X is

N, SO$_3$N, or SN when $a$ is 2, R is an alkyl group having from 1 to 4 carbon atoms and R' is a random mixture of oxyethylene to oxypropylene groups, said mixture being from 67% to 80% of the total weight of the surfactant, the weight ratio of oxyethylene to oxypropylene groups in said mixture being in the range of from 1.3:1 to 6.8:1, said composition having an iodine to surfactant weight ratio of from 0.01:1 to 0.5:1,
(b) 0.5 to 35 parts of an acid selected from the group consisting of phosphoric acid, hydrochloric acid, sulfamic acid, hydroxyacetic acid, citric acid, malic acid, and mixtures thereof, and
(c) 15 to 97.5 parts of water.

6. The composition of claim 5 when the weight ratio of oxyethylene to oxypropylene groups is in the range of 1.5:1 to 4:1.

7. The composition of claim 5 when the acid is phosphoric acid.

8. The composition of claim 5 when the acid is a mixture of phosphoric acid and hydrochloric acid.

9. The composition of claim 5 when the acid is a mixture of phosphoric acid and hydroxyacetic acid.

10. A detergent, germicidal and sanitizing composition consisting essentially of, based on 100 parts, from
(a) 2 to 50 parts of a mixture of elemental iodine and a liquid, biodegradable, water-miscible, nonionic surfactant of the formula:

R°—A—O—(R')$_a$—H wherein R° is H, A is a straight chain alkylene group having from 8 to 22 carbon atoms or mixtures thereof, $a$ is 1 and R' is as defined in claim 1, said composition having an iodine to surfactant weight ratio of from 0.01:1 to 0.5:1,
(b) 0.5 to 35 parts of an acid selected from the group consisting of phosphoric acid, hydrochloric acid, sulfamic acid, hydroxyacetic acid, citric acid, malic acid, and mixtures thereof, and
(c) 15 to 97.5 parts of water.

11. The composition of claim 10 when the weight ratio of oxyethylene to oxypropylene groups is in the range of 1.5:1 to 4:1.

12. The composition of claim 10 when the acid is phosphoric acid.

13. The composition of claim 10 when the acid is a mixture of phosphoric acid and hydrochloric acid.

14. The composition of claim 10 when the acid is a mixture of phosphoric acid and hydroxyacetic acid.

References Cited

UNITED STATES PATENTS 2,677,700    5/1954    Jackson et al. _____ 252—89
2,674,619    4/1954    Lundsted _____ 252—89

(Other references on following page)

UNITED STATES PATENTS

| | | | |
|---|---|---|---|
| 2,759,869 | 8/1956 | Sutton et al. | 252—107 |
| 2,977,315 | 3/1961 | Scheib et al. | 252—106 |
| 3,029,183 | 4/1962 | Winicov et al. | 252—106 |
| 3,220,951 | 11/1965 | Cantor et al. | 252—106 |

FOREIGN PATENTS

| | | |
|---|---|---|
| 215,922 | 7/1958 | Australia. |
| 703,091 | 10/1954 | Great Britain. |

OTHER REFERENCES

Blankenship et al.: Biodegradation of Nonionics Soap and Chemical Specialties, December 1963, pp. 75–78 and 181.

LEON D. ROSDOL, *Primary Examiner.*

W. SCHULZ, *Assistant Examiner.*

U.S. Cl. X.R.

424—150; 260—615

U.S. DEPARTMENT OF COMMERCE
PATENT OFFICE
Washington, D.C. 20231

UNITED STATES PATENT OFFICE
CERTIFICATE OF CORRECTION

Patent No. 3,438,906                          April 15, 1969

Jacque L. Duvall

It is certified that error appears in the above identified patent and that said Letters Patent are hereby corrected as shown below:

Column 7, line 73, claim reference numeral "4" should read -- 3 --. Column 8, line 7, "$X(R'S)_a$" should read -- $X(R'H)_a$ --.

Signed and sealed this 7th day of April 1970.

(SEAL)
Attest:

Edward M. Fletcher, Jr.                      WILLIAM E. SCHUYLER, JR.
Attesting Officer                              Commissioner of Patents